United States Patent
Delmoro et al.

(10) Patent No.: US 7,597,759 B1
(45) Date of Patent: Oct. 6, 2009

(54) TIRE BEAD LUBRICATING SYSTEM

(75) Inventors: Richard L. Delmoro, Tallmadge, OH (US); David P. Krause, Hartville, OH (US)

(73) Assignee: Akron Special Machinery, Inc., Akron, OH (US)

(*) Notice: Subject to any disclaimer, the term of this patent is extended or adjusted under 35 U.S.C. 154(b) by 711 days.

(21) Appl. No.: 11/353,819

(22) Filed: Feb. 14, 2006

(51) Int. Cl.
*B05C 1/08* (2006.01)
*B05C 5/02* (2006.01)
*B05D 1/02* (2006.01)

(52) U.S. Cl. .................. 118/214; 118/215; 118/244; 118/254; 118/255; 118/258; 118/304; 118/313; 118/317; 118/323; 184/101

(58) Field of Classification Search ............ 118/214, 118/215, 218, 219, 221, 225, 232, 244, 254, 118/255, 258, 263, 304, 313, 317, 318, 323; 184/101, 102, 6.26; 15/88.2, 88.3, 302; 134/8; 427/230, 236, 421.1, 427.3, 428.08
See application file for complete search history.

(56) References Cited

U.S. PATENT DOCUMENTS

| 324,864 | A | | 8/1885 | McCorkindale | 101/213 |
|---|---|---|---|---|---|
| 2,537,851 | A | | 1/1951 | Pannier | 101/367 |
| 2,881,461 | A | | 4/1959 | Parker | 15/230.11 |
| 3,001,609 | A | | 9/1961 | Macks | 184/18 |
| 3,658,152 | A | | 4/1972 | Mueller | 118/233 |
| 3,825,965 | A | * | 7/1974 | Root et al. | 15/88.3 |
| 4,272,301 | A | * | 6/1981 | Galbraith et al. | 134/8 |
| 4,638,756 | A | | 1/1987 | Collmann | 118/215 |
| 4,669,417 | A | * | 6/1987 | Pederson et al. | 118/44 |
| 4,958,587 | A | * | 9/1990 | Fogal et al. | 118/206 |
| 5,992,568 | A | | 11/1999 | Craig et al. | 105/72.2 |
| 6,070,697 | A | | 6/2000 | Millard | 184/15.1 |
| 6,082,191 | A | | 7/2000 | Neiferd et al. | 73/146 |
| 6,209,684 | B1 | * | 4/2001 | Kane et al. | 184/101 |
| 6,520,294 | B2 | | 2/2003 | Delmoro et al. | 184/20 |
| 7,122,220 | B1 | * | 10/2006 | Hawkins et al. | 427/236 |

OTHER PUBLICATIONS

Hasbach Maschinen-und Anlagenbau GmbH "Perfection in Testing".

* cited by examiner

*Primary Examiner*—Laura Edwards
(74) *Attorney, Agent, or Firm*—Renner, Kenner, Greive, Bobak, Taylor & Weber (57) ABSTRACT

A tire lubricating system including an applicator assembly having plural applicators movable along a vertical axis to enter the bore of a tire and extensible in a radial direction to contact the beads of the tire and apply a lubricant thereto.

15 Claims, 6 Drawing Sheets

TIRE BEAD LUBRICATING SYSTEM

TECHNICAL FIELD

This invention generally relates to a system for lubricating the bead area of a pneumatic tire.

BACKGROUND OF THE INVENTION

In many operations involving the manufacture of pneumatic tires, following fabrication and vulcanization, the tire is placed on a chuck assembly so that various inspection and grinding operations can be performed. Generally, for example, in a tire uniformity machine, tires are advanced along a conveyor into the uniformity inspection machine whereupon a first chuck is raised to engage the bead area of the tire following which the tire is elevated so that the opposed bead is engaged by a second chuck. The tire is then inflated and various inspections are conducted. The tire is then deflated, the lower chuck is retracted, and the tire is removed from the chuck and removed from the machine so that another tire may be tested.

In such a system and in other areas where tires are mounted on chucks for further manufacturing, inspection, or grinding operations, it is desirable to lubricate the bead area along its seating surface so as to achieve a complete airtight seal with the mating surfaces of the chuck or, for that matter, the wheel of an automobile.

U.S. Pat. No. 6,520,294 assigned to Akron Special Machinery, Inc., shows an existing lubricating system having a vertically-oriented roller that is mounted beneath a conveyor and housed in a container filled with lubricating fluid to coat the applicator roll. As a tire moves into a position above the lubricating roll, it is extended upward along its axis to enter the bore defined by the tire. The tire is driven on the conveyor, causing it to contact the roller and rotate about the roller to apply lubricant to the beads. Since contact between the applicator and the beads relies on the conveyor driving the tire into contact with the applicator, the applicator is stressed by the impact with the tire. Oftentimes, the tire will impact the roller multiple times until achieving the proper position. Therefore, it is believed desirable to provide a tire lubrication system having an improved applicator assembly.

SUMMARY OF THE INVENTION

It is, therefore, an object of the present invention to provide a tire lubricating system having an improved applicator assembly. To that end, the present invention generally provides a tire lubrication system including an applicator assembly having plural applicators movable along a vertical axis to enter the bore of a tire and extensible in a radial direction to contact the beads of the tire and apply a lubricant thereto.

DETAILED DESCRIPTION OF THE INVENTION

Figure 1:
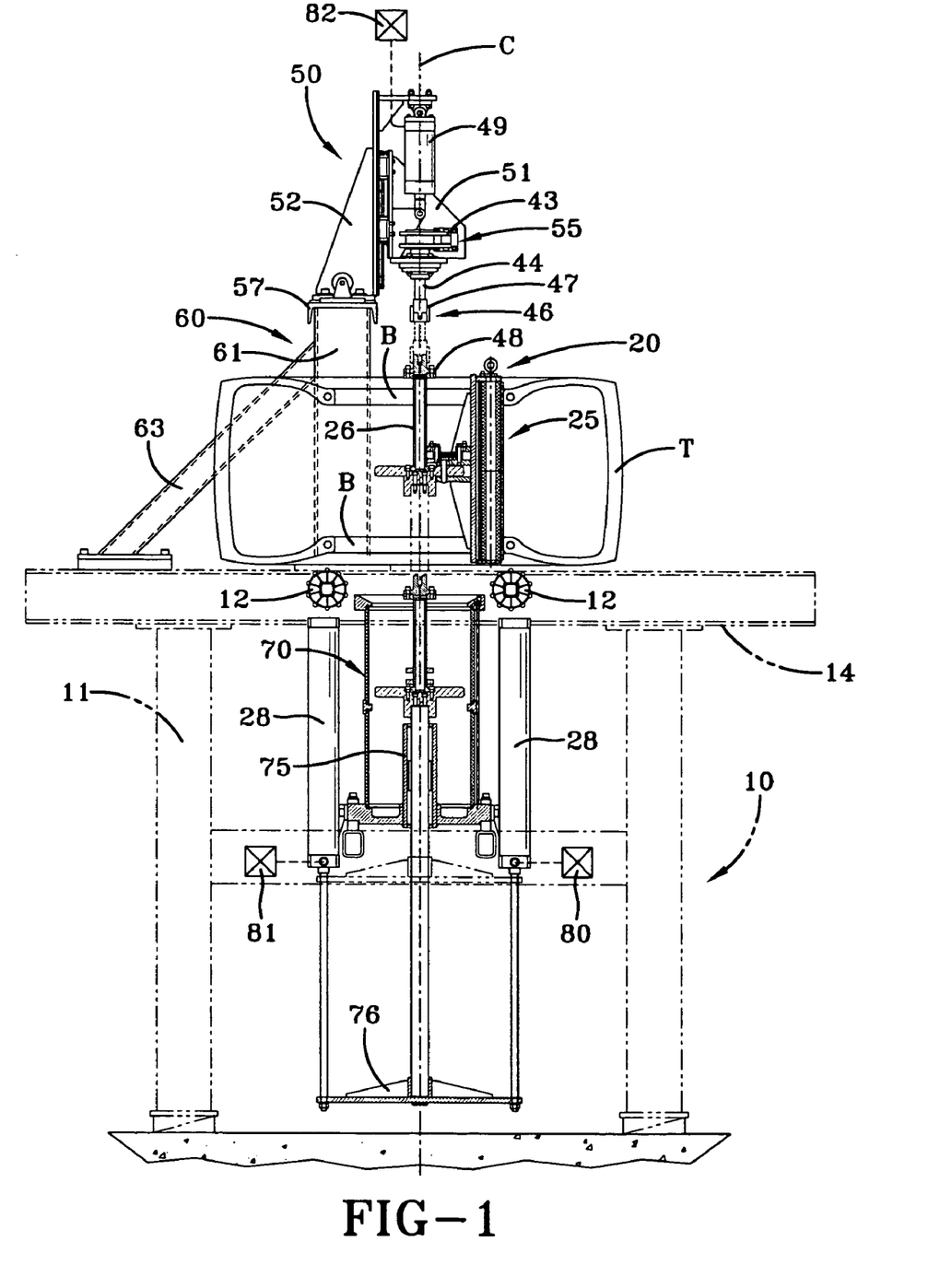
FIG. 1 is a side-elevational view showing a tire lubricating system according to the concepts of the present invention in place on a conventional conveyor.

As shown in FIG. 1, it will be seen that a conveyor assembly, generally indicated by the numeral 10, is essentially conventional in nature and includes a frame 11 and a series of rollers 12 disposed on top of frame 11. Some of these rollers 12 extend the full distance between the side members 14 of the frame 11, while others extend only partially therebetween to define an opening, generally indicated by the number 15, in the top surface of the conveyor 10. FIG. 1 illustrates a tire T disposed on top of such a conveyor assembly 10 with a lubricating system, generally indicated by the number 20, inserted into the interior of the tire T to apply lubricant to the bead areas B.

Lubricating system 20 includes an applicator assembly, generally indicated by the number 25, having a pivot shaft 26 that defines a vertically-extending axis C. Pivot shaft 26 is supported by at least one cylinder 28 that causes movement of the applicator assembly 25 along the axis C. In this way, the applicator assembly 25 may be moved axially to enter or exit the interior of the tire T. In the example shown, the applicator assembly 25 rests below conveyor 10 and is driven axially upward through opening 15 to enter the tire T.

Figure 6:
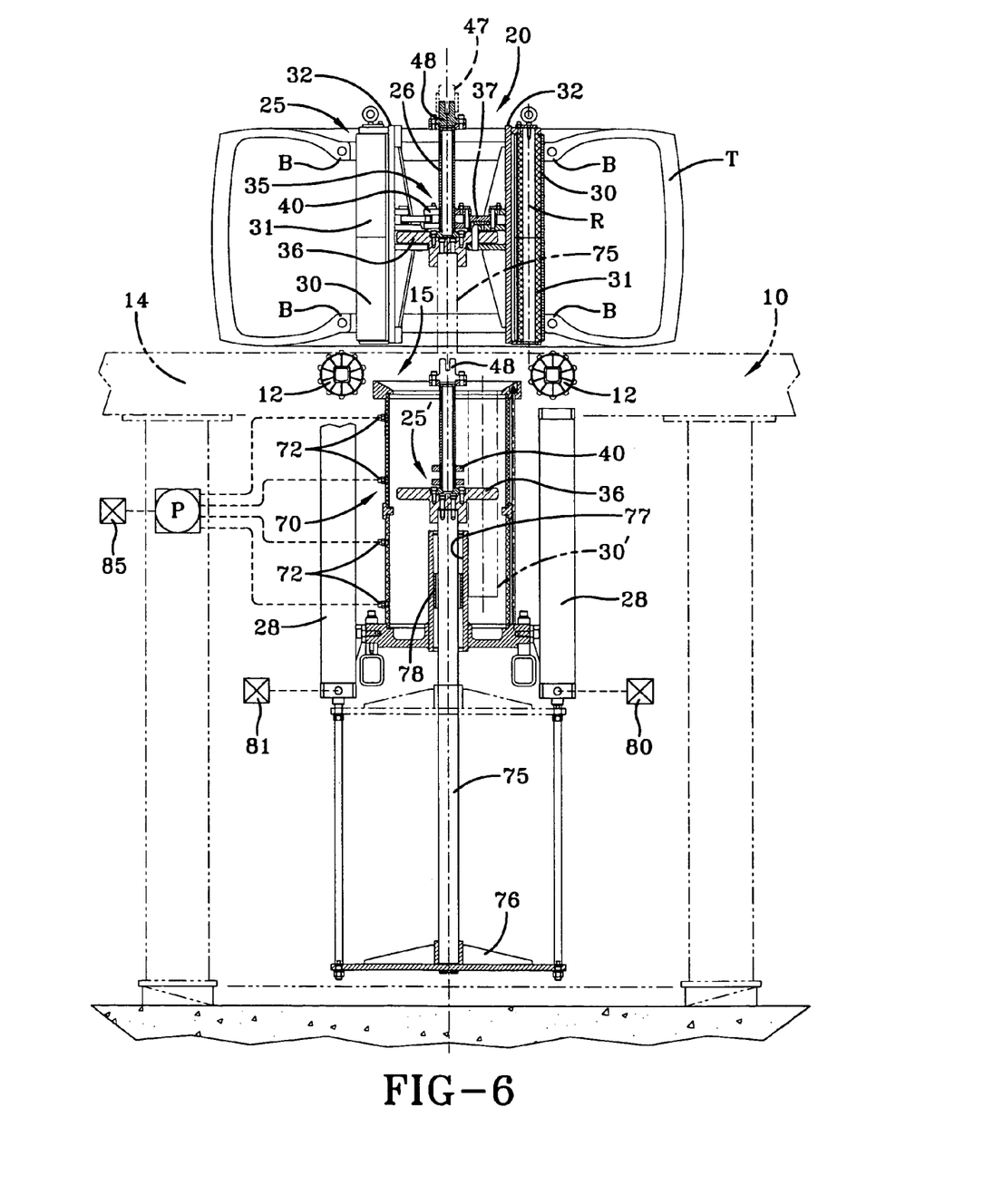
FIG. 6 is a side-elevational view similar to FIG. 1 enlarged to show further details of the lubricating system.

As best shown in FIG. 6, applicator assembly 25 includes plural applicators 30 mounted on pivot shaft 26. Applicators 30 may be any structure suitable for applying lubricant on the tire T. Applicators 30 may be of any type known in the art, including the cylindrical rollers shown or a roller of the type described in U.S. Pat. No. 6,520,294, which is incorporated herein by reference, having an hourglass profile for contacting the upper and lower beads of the tire T. In the depicted example, each applicator 30 includes and lubricating roll 31, which may be generally cylindrical in shape. The lubricating roll 31 may have sufficient height to simultaneously contact both bead areas B. To facilitate rotation of tire T, each lubricating roll 31 may be rotatably mounted on a roll bracket 32 that permits rotation about a vertical roll axis R.

Figure 3:
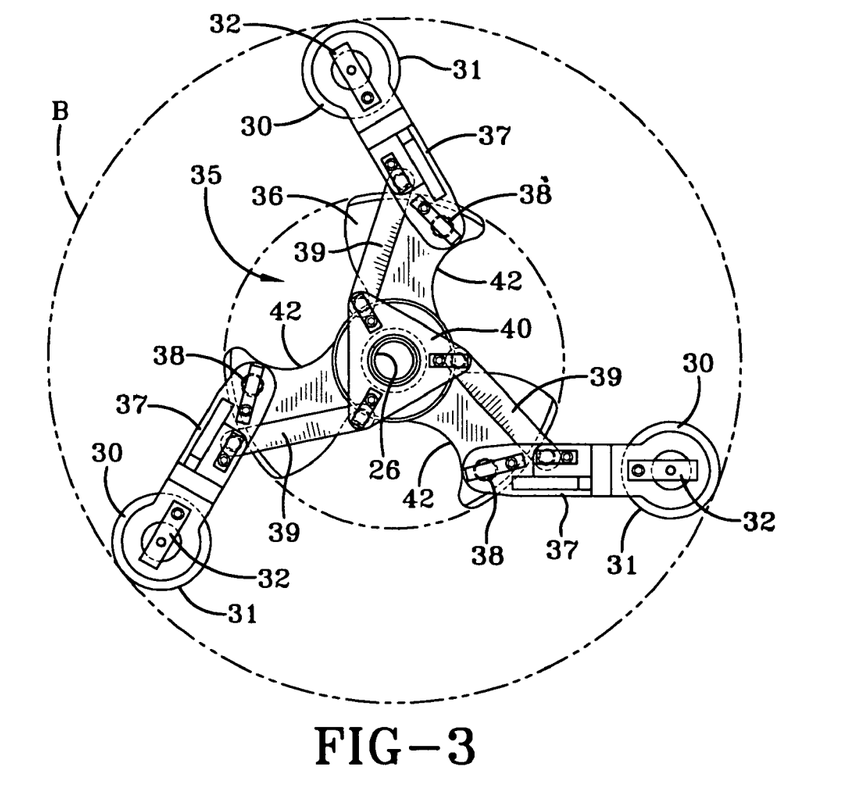
FIG. 3 is a top plan view of an applicator assembly according to the concepts of the present invention having plural applicators shown in a retracted position, where the applicators have been moved radially inward.

Applicators 30 are radially movable between a retracted position (FIG. 4) and an extended position (FIG. 3). In the retracted position, applicators 30 are more easily inserted within the bore of tire T and are extended to cause applicators 30 to contact bead area B of tire T. By expanding to contact bead area B of tire T, the plural applicators 30 effectively position tire T about the center axis C of applicator assembly 25. Radial movement of the applicators 30 may be made by any known drive assembly 35 capable of driving applicators 30 radially outward from the collapsed position (FIG. 4) to the contact bead areas B.

Figure 4:
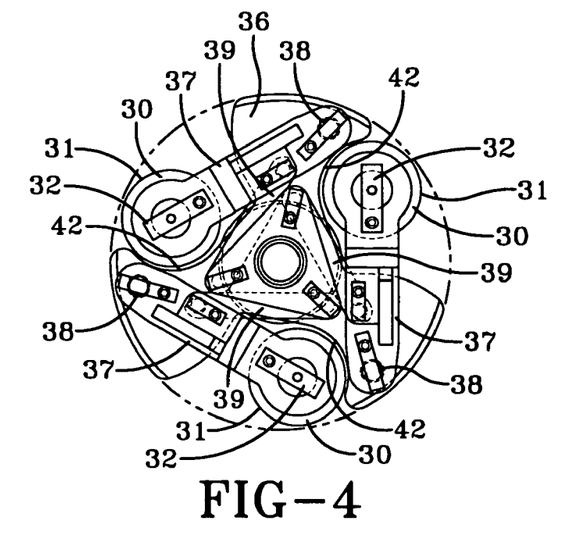
FIG. 4 is a top plan view similar to FIG. 3 with the applicators in an extended position, where the applicators have been moved radially outward.

Drive assembly 35 may, for example, include a linkage connected to a pivot shaft 26, such that rotation of pivot shaft 26 radially moves applicators 30. In the example shown, three applicators 30 are mounted on a hub 36. As best shown in FIG. 3, each applicator 30 may be mounted on an arm 37 that is pivotally attached to hub 36, as by a pin 38. A control link 39 attaches to the arm 37 radially outward of the pin 38. The opposite end of each control link 39 attaches to a rotating link 40, which, as shown, may be triangular in configuration with each control link 39 pivotally attached at one corner thereof. Rotating link 40 is attached to pivot shaft 26 and rotates with pivot shaft 26. Rotation of the rotating link 40 on pivot shaft 26 causes control link 39 to cause rotation of the arms 37 about pin 38, resulting in radial displacement of the applicators 30. While the applicators 30 may be retracted to a position where they contact the hub 36, as best seen in FIG. 3, hub 36 may define recesses 42 that receive the applicators 30 allowing the applicator assembly 25 to achieve a very compact configuration when in the collapsed position (FIG. 4). Recesses 42 open radially outward so that even in the collapsed position, the applicators 30 may contact the bead of a small diameter tire and provide sufficient clearance for rotation of applicator roll 31 on its axis R.

Figure 5:
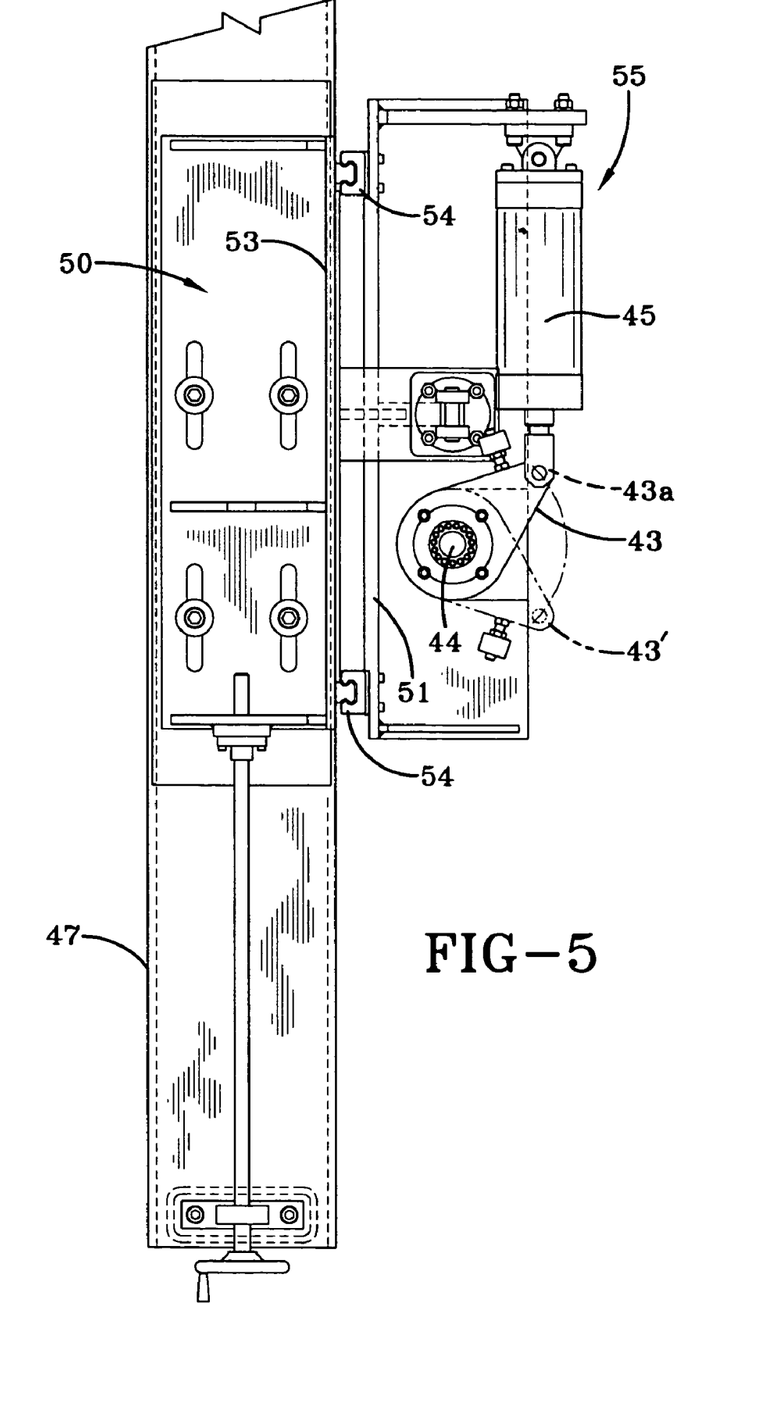
FIG. 5 is a fragmented top plan view of a tire lubricating system similar to the one shown in FIG. 1, enlarged to show details of an actuator used to control radial extension of the applicators.

Rotation of rotating link 40 to selectively expand and retract applicators 30 may be controlled by a suitable motor or other actuator. In the example shown in FIG. 1, a turning link 43 is mounted on and rotatably fixed to a control shaft 44 that is coupled to pivot shaft 26, as described below, so that pivot shaft 26 rotates with turning link 43. As best shown in FIG. 5, turning link 43 includes a radially extending tab 43a that is connected to a control cylinder 45. As best shown in FIG. 5, control cylinder 45 is pivotally connected to tab 43a, as by a pin, and extends and retracts to cause rotation of turning link 43 and in turn pivot shaft 26. In the example shown, retraction of control cylinder 45 (solid line) rotates pivot shaft 26 to retract applicators 30 to the collapsed position (FIG. 4). Extension of cylinder 45 rotates turning link 43 toward an extended position 43' (broken lines) that cause applicators 30 to extend radially outward, as shown for example in FIG. 3.

Figure 2:
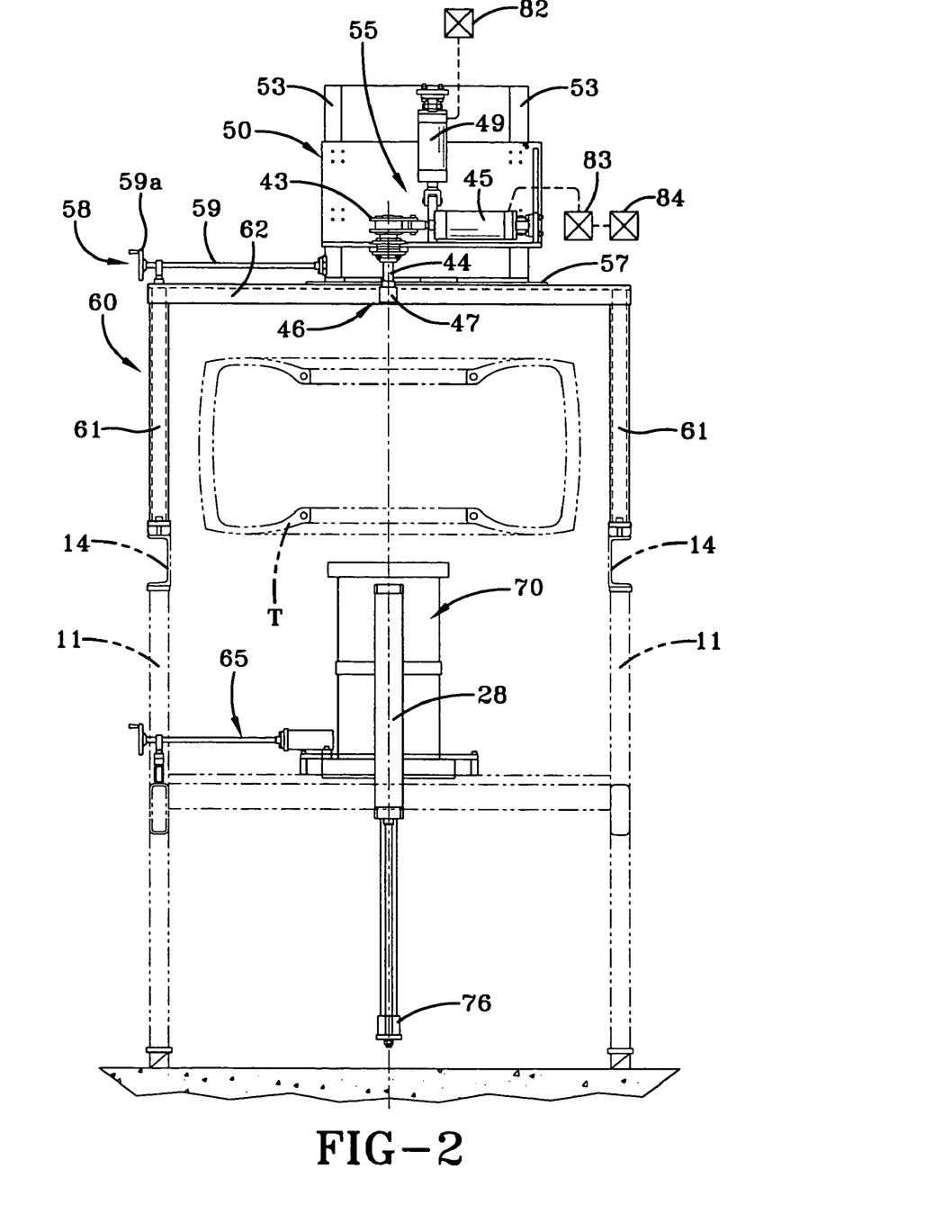
FIG. 2 is a front-elevational view of the tire lubricating system depicted in FIG. 1 shown in place on a conventional conveyor, where the conveyor rollers have been removed to show details of the tire lubricating system.

It will be appreciated that pivot shaft 26 could be turned directly to cause rotation of hub 36 and, accordingly, radial movement of the applicators 30. Alternatively, as shown in the depicted example, radial movement of the applicators 30 may be controlled by a control shaft 44 that couples with pivot shaft 26. With reference to FIGS. 1 and 2, control shaft 44 is supported above applicator assembly 25 and extends downwardly to be coupled with pivot shaft 26. Any suitable coupler, generally indicated by the number 46, may be used to rotatably couple shafts 26, 44. In the example shown, a drive coupling 47 is mounted on the end of control shaft 44 and includes a cap-like member having at least one flange received in corresponding notches formed in a driven coupling 48 (FIG. 6) mounted on pivot shaft 26. It will be appreciated that the orientation of the couplings 47, 48 may be reversed. As shown in FIG. 1, vertical movement of shaft 44 from a raised position (solid line) to a lowered position (broken line) to effect coupling and decoupling of pivot shaft 26 with the control shaft 44 may be controlled by an engaging cylinder 49. As shown, the turning link 43, control shaft 44, and control cylinder 45 may be supported on a bracket 51 that is supported on a control frame, generally indicated by the number 50. Control frame 50 includes a first portion 52 having a pair of vertically-extending rails 53 (FIG. 2) on which the turning link 43, control shaft 44, and cylinder 45, collectively referred to as the engagement assembly 55, are slidably mounted by way of bracket 51, which has suitable receivers 54 attached thereto, as best shown in FIG. 5. Control frame 50 may be supported above the conveyor 10 so that control shaft 44 and coupler 47 may be raised above the tires T on the conveyor 10 after bead areas B are lubricated. To that end, a support frame, generally indicated by the number 60, may be provided. Support frame 60 may be mounted on side rails 14 of frame 11. As best shown in FIGS. 1 and 2, the support frame 60 may include vertically extending support members 61 that extend upwardly from side rails 14 of frame 11 above conveyor 10. A header 62 spans side support members 61. As best shown in FIG. 1, if necessary, additional support for side members 61 may be provided by an angle support 63. For example, angle support 63 may extend upwardly and forwardly from a point downstream of lubricating system 20 and attach to the side support member 61 near its upper vertical extremity.

Engagement assembly 55 may be supported above the conveyor 10 on header 62 and, as shown in FIGS. 1 and 2, may be movable along the header 62 to align engagement assembly 55 with applicator assembly 25 or center shaft 44 relative to the tire testing machine (not shown). In the example shown, control frame 50 is slidably mounted on header 62 by a generally U-shaped base 57 that opens downwardly to grasp the front and rear sides of the header 62. An actuator, generally indicated by the number 58, may be mounted on the header 62 and contacts control frame 50 to selectively move engagement assembly 55 on header 62. In the example shown, a screw-type actuator 59 is provided with a hand wheel 59a that allows manual adjustment of the position of the lubricating system 20 on header 47. It will be appreciated that an automated system may be employed if desired.

In similar fashion, the applicator assembly 25 may be slidably mounted on frame 11 of conveyor 10 and driven by an actuator, generally indicated by the number 65, so that it may be aligned with engagement assembly 55.

To apply lubrication fluid to the applicators 30, a lubricating container, generally indicated by the number 70, may be provided beneath the conveyor 10 and aligned with the opening 15 in conveyor 10 such that the applicators 30 may be dipped into the container 70 to be coated with lubricating fluid. Alternatively, container 70 may include one or more nozzles 72 (FIG. 6) that spray lubricating fluid onto the applicators 30 when they are located inside the container 70. As shown, when not applying lubricant to bead areas B, applicator assembly 25 may reside in container 70. Applicator assembly 25 may be supported on a column 75 that extends through the base 71 of container 70 and is coupled to cylinder 28, as by a bracket 76. As shown, plural cylinders 28 may be used with each cylinder 28 being coupled to bracket 76. In the example shown, a pair of diametrically opposed cylinders 28 is attached to opposite sides of bracket 76 with the column 75 centered therebetween.

To allow positioning of applicator assembly 25 as described above, cylinder(s) 28 may be attached to container 70 and move with container 70 by operation of actuator 65. To accommodate shaft 75, container 70 defines a bore 77 for receiving column 75 and may include a seal 78 that engages column 75.

As shown best in FIG. 6, applicator assembly 25 may be attached to column 75 at hub 36. With hub 36 fixed to column 75, pivot shaft 26 rotates relative to hub 36 to cause rotation of rotating link 40 and control link 37 to effect expansion and retraction of applicators 30. To that end, hub 36 may define a recess that receives the end of pivot shaft 26.

Figure 7:
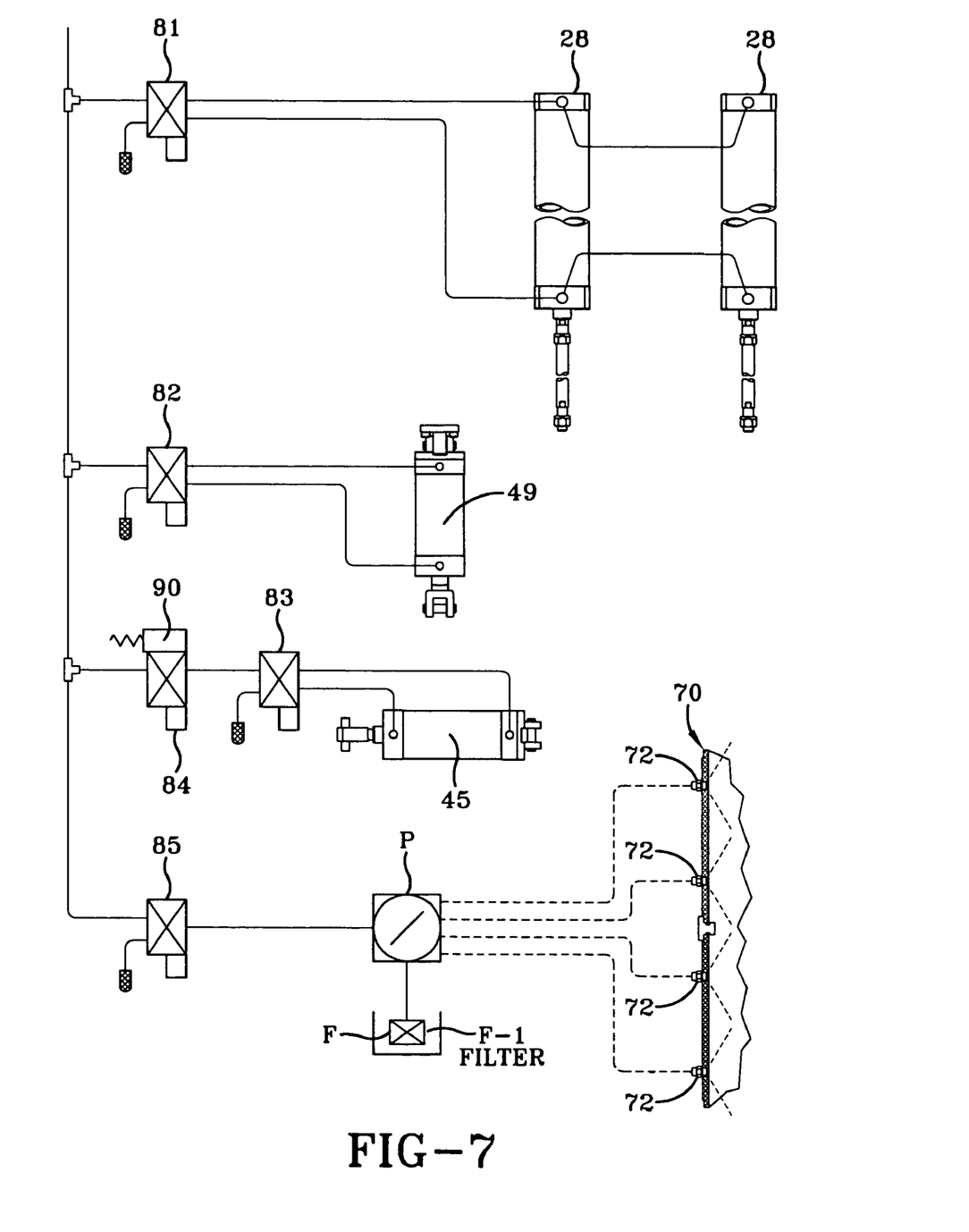
FIG. 7 is a schematic diagram depicting a fluid control system used in a tire lubricating system according to the concepts of the present invention.

As depicted in the figures, operation of applicator assembly 25 may be controlled by various actuators, including fluid-driven cylinders. These cylinders are selectively connected to a fluid supply to control their movement. For example, as best shown in FIG. 7, a first servo valve 81 is associated with cylinder 28 and is selectively energized to retract cylinder 28, raising column 75 and the applicator assembly 25 mounted thereon. A proximity switch 80 (FIG. 1) senses when the applicator assembly 25 is fully raised. A second servo valve 82, associated with cylinder 49, is energized to lower engagement assembly 55 until drive coupling 47 slides over and engages driven coupling 48 (FIG. 6). A third servo valve 83, associated with control cylinder 45, is energized to extend cylinder 45 rotating pivot shaft 26 to expand applicators 30 to contact the inside diameter of the tire's bead B and continue moving until the tire T is positioned concentrically with the center of the applicator assembly 25. A fourth servo valve 84 is also associated with control cylinder 45 and supplies regulated air pressure from a pressure regulator, schematically shown and indicated by the number 90, to control the force of the applicators 30 on the bead B. At this point, conveyor belt motors may be energized with the near side moving in one direction and the far side moving in the other direction to cause rotation of the tire T about the applicator assembly 25. Lubrication fluid on the applicators 30 is thus transferred to the bead area B as the tire rotates. The time of rotation may be programmed for a selected period to apply an adequate film of lubricant on each bead area B. After a suitable film is applied, rotation of tire T is stopped by de-energizing the conveyor motors, and fourth servo valve 84 is de-energized to cut off the regulated pressure flow, and third servo valve 83 is de-energized to retract cylinder 45 rotating pivot shaft 26 to collapse the applicator assembly 25. With the applicator assembly 25 collapsed, second servo valve 82 is de-energized to retract cylinder 49, which raises engagement assembly 55 until the drive coupling 47 disengages the driven coupling 48 and clears the top of the tire T. First servo valve 81 is de-energized to extend cylinder 28, lowering the applicator assembly 25 into the container 70. After the applicator assembly 25 clears the tire T, the conveyor transports the tire T into the testing machine. Beneficially, the centering operation performed by the applicator assembly 25 causes the tire T to enter the testing machine in a centerline position.

With the applicator assembly 25 in the container 70, a fifth servo valve 85 associated with a lubricating fluid pump P may be energized to pump lubricating fluid to nozzles 72 and spray lubricating fluid onto applicators 30. The spray may beneficially be used to dislodge debris and contaminants that might have collected on applicators 30. Excess fluid running off of the applicators 30 is collected by container 70 and channeled to a filter F, which removes the contaminants before re-circulating the fluid through pump P.

In accordance with the patent statutes, only preferred embodiments of the present invention are described and shown herein. Various modifications or deviations from these embodiments may be made without departing from the present invention. Thus, for an appreciation of the invention's scope, reference should be made to the appended claims.

The invention claimed is:

1. A lubricating system for applying lubricant to a bead area of a tire, the lubricating system comprising an applicator assembly being axially moveable to enter a bore of the tire, said applicator assembly having a hub carrying plural applicators adapted to carry the lubricant, said applicators being radially movable to contact the bead area of the tire, said applicator assembly including a drive assembly having a pivot shaft, a rotating link mounted on said pivot shaft, and a control link connected to said rotating link; and wherein each applicator is supported on an arm pivotally attached to said hub and connected to said rotating link by said control link, wherein selected rotation of said rotating link moves said applicators radially.

2. The applicator assembly of claim 1, wherein said hub defines recesses for receiving said applicators in a collapsed position.

3. The lubricating system of claim 2, wherein said applicators are rotatable about a vertical axis and wherein said recesses are sized to permit rotation of said applicators about said axis in said collapsed position.

4. The lubricating system of claim 1, wherein said applicator assembly includes three applicators.

5. The lubricating system of claim 4, wherein said applicators include a lube roll rotatable about a vertical axis.

6. The lubricating system of claim 5, wherein said lube roll has a length adapted to simultaneously contact both bead areas of said tire.

7. A lubricating system for applying lubricant to a bead area of a tire, the lubricating system comprising an applicator being axially moveable to enter a bore of the tire, said applicator assembly having a hub carrying plural applicators adapted to carry the lubricant, said applicators being radially movable to contact the bead area of the tire, and a container adapted to receive said applicator assembly, wherein said container includes at least one nozzle adapted to spray lubricating fluid onto said applicator, said applicator assembly being mounted on an actuator adapted to move said applicator assembly from within said container to a position within the bore of the tire.

8. A lubricating system for applying lubricant to bead areas of a tire used in connection with a conveyor used to transport the tire, the lubricating system comprising: a container; and an applicator assembly receivable in said container and axially movable from said container to enter a bore of the tire, said applicator assembly including a hub supporting plural applicators, said applicators being radially movable on said hub and a drive assembly adapted to selectively move said applicators radially to contact the bead areas of the tire.

9. The lubricating system of claim 8, wherein said container is located below the conveyor, and said applicator assembly includes a column supporting said hub, said column extending through a base of said container and attached to a column actuator adapted to move said applicator assembly along the axis of said column.

10. The lubricating system of claim 9 further comprises an alignment actuator engageable with said container and adapted to selectively move said container relative to the conveyor; and wherein said column actuator is supported on said container and moveable therewith.

11. The lubricating system of claim 8 further comprising an engagement assembly engageable with said drive assembly, wherein said engagement assembly includes a control shaft and a control actuator adapted to selectively rotate said control shaft, said control shaft being selectively coupled to a pivot shaft in said drive assembly, said drive assembly further includes a rotating link mounted on said pivot shaft and attached to each applicators by a control link, wherein said applicators are pivotally connected to said hub by an arm, wherein rotation of said pivot shaft radially moves said applicators.

12. The lubricating system of claim 11 further comprising a support frame supporting said engagement assembly, wherein said engagement assembly is slidably mounted on said support frame and laterally moveable; and an alignment actuator engageable with said engagement assembly to selectively move said engagement assembly laterally relative to said drive assembly.

13. The lubricating system of claim 8, wherein said container includes nozzles adapted to spray the lubricant on to said applicators.

14. A lubricating system for applying lubricant to a bead area of a tire as it is carried on a conveyor, the lubricating system comprising:

a container adapted to collect the lubricant, said container being supported beneath an opening in the conveyor;

an applicator assembly receivable in said container said applicator assembly including
    a hub defining a center axis,
    an actuator connected to said hub and operable to move said applicator assembly along said center axis to enter ha bore of the tire,
    plural arms pivotally attached to said hub,
    an applicator adapted to carry the lubricant supported on each of said arms, and
    a drive assembly, said drive assembly including:
        a pivot shaft rotatably supported on said hub,
        a rotating link mounted on said pivot shaft and rotatable therewith, and
        plural control links connecting said rotating link to each arm; and
an engagement assembly selectively coupled to said drive assembly and adapted to selectively rotate said pivot shaft to move said applicators radially into contact with the bead area of the tire to deposit lubricant carried on said applicators on the bead area.

15. The lubricating system of claim 14 further comprising a support frame, a bracket mounted on said support frame above the tire, said bracket being vertically moveable, wherein said engagement assembly is mounted on said bracket and includes a control shaft, a control link mounted on said control shaft adapted to couple said pivot shaft and a control actuator attached to said control link and operable to rotate said control shaft; wherein said support frame supports an engaging actuator, said engaging actuator being operable to selectively lower said bracket to couple said control shaft and said pivot shaft.

* * * * *

UNITED STATES PATENT AND TRADEMARK OFFICE
CERTIFICATE OF CORRECTION

PATENT NO. : 7,597,759 B1  
APPLICATION NO. : 11/353819  
DATED : October 6, 2009  
INVENTOR(S) : Delmoro et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 906 days.

Signed and Sealed this

Twenty-eighth Day of September, 2010

David J. Kappos  
*Director of the United States Patent and Trademark Office*